Dec. 31, 1935.  L. RICEFIELD  2,025,828
COUPLING
Filed March 21, 1935  4 Sheets-Sheet 1
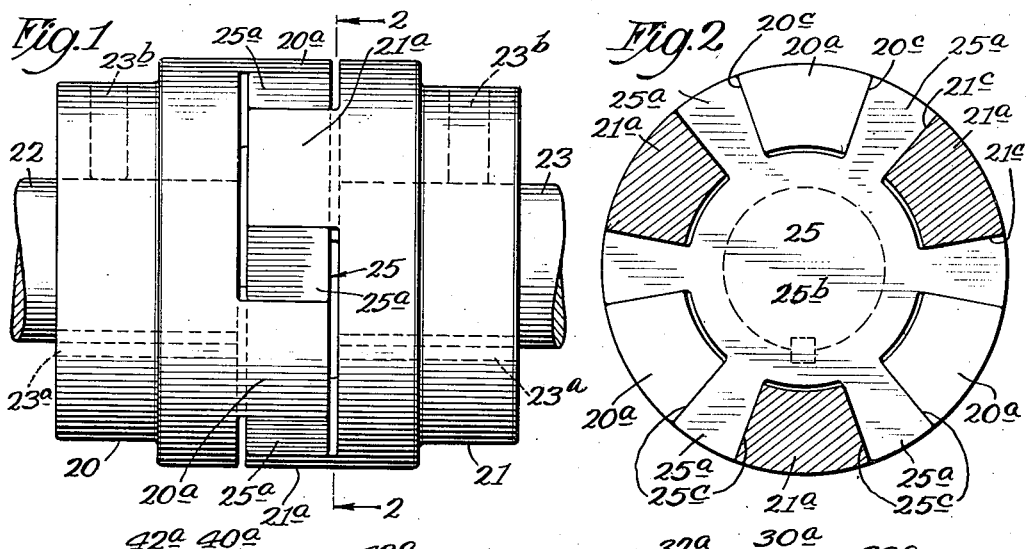

Dec. 31, 1935.  L. RICEFIELD  2,025,828
COUPLING
Filed March 21, 1935   4 Sheets-Sheet 2
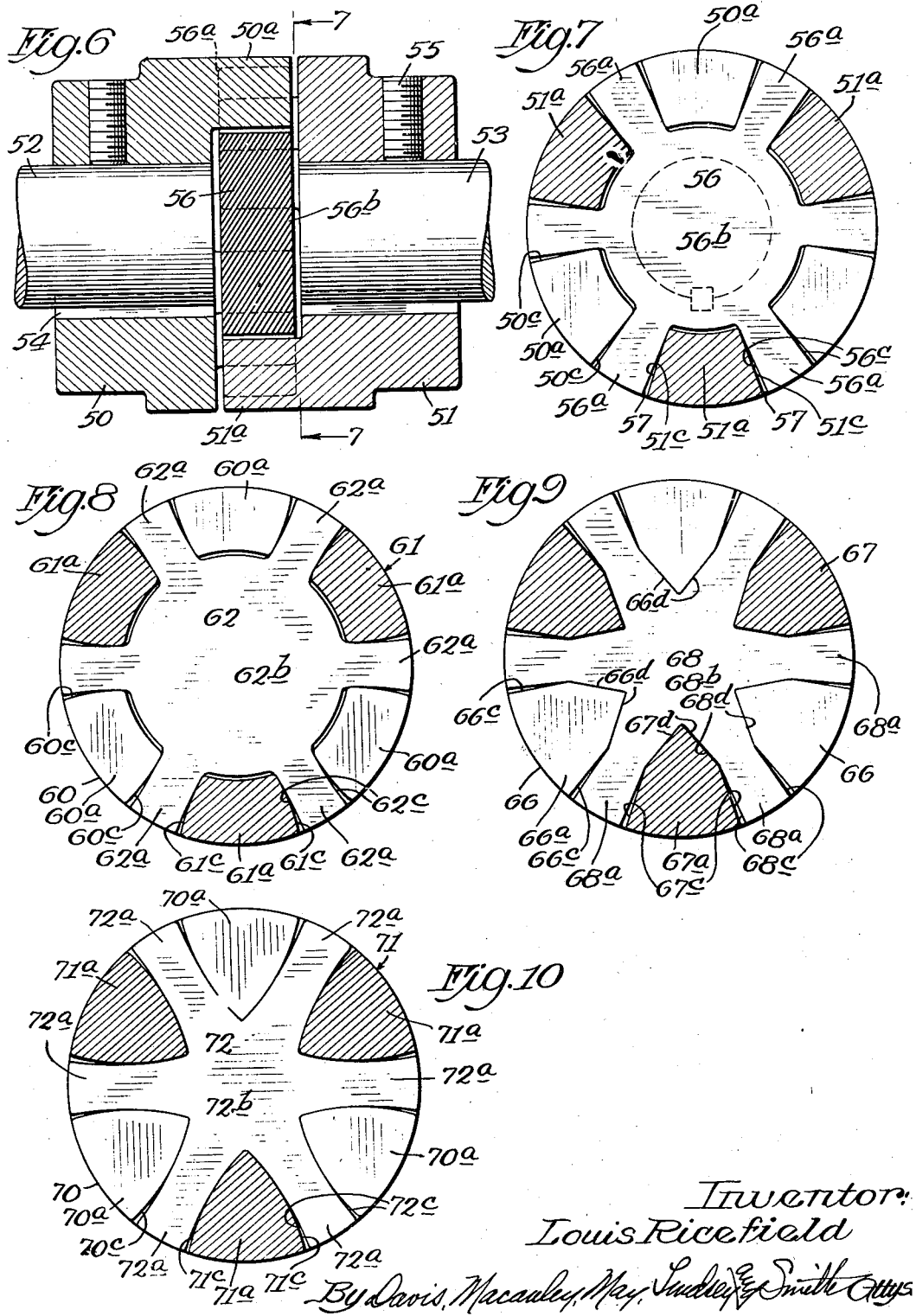

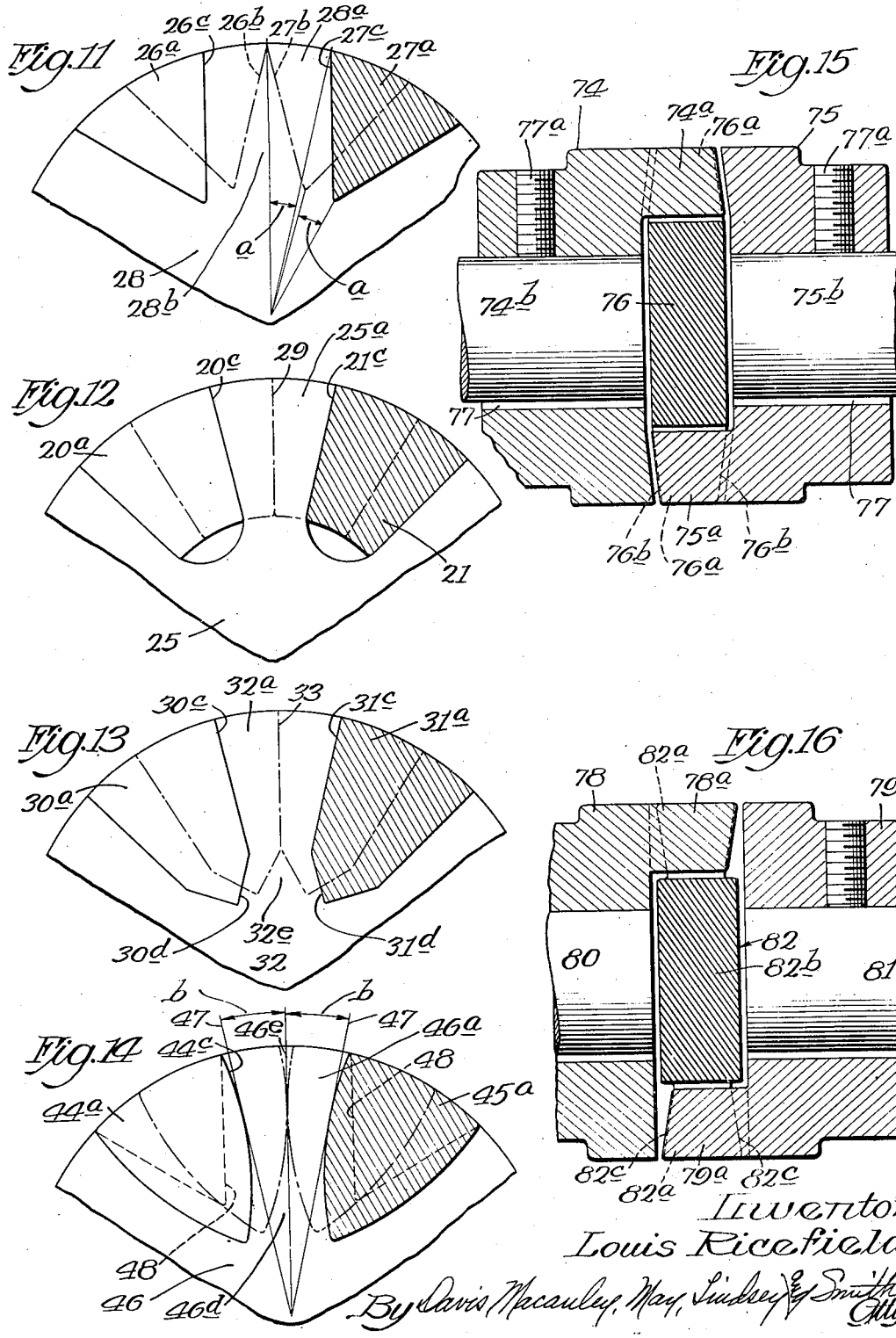

Dec. 31, 1935.                L. RICEFIELD                2,025,828
COUPLING
Filed March 21, 1935           4 Sheets-Sheet 4
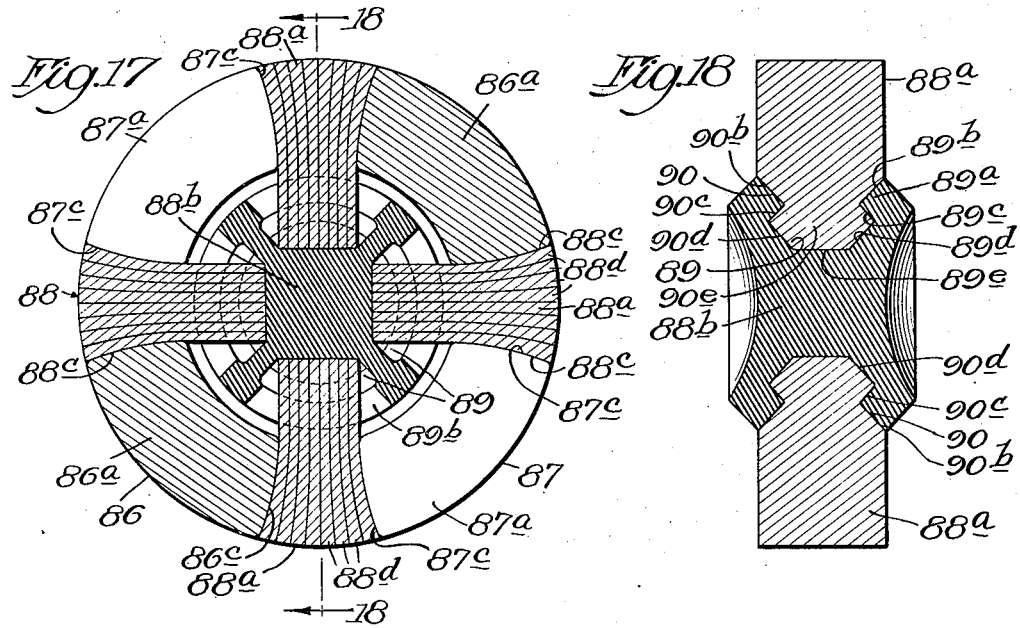
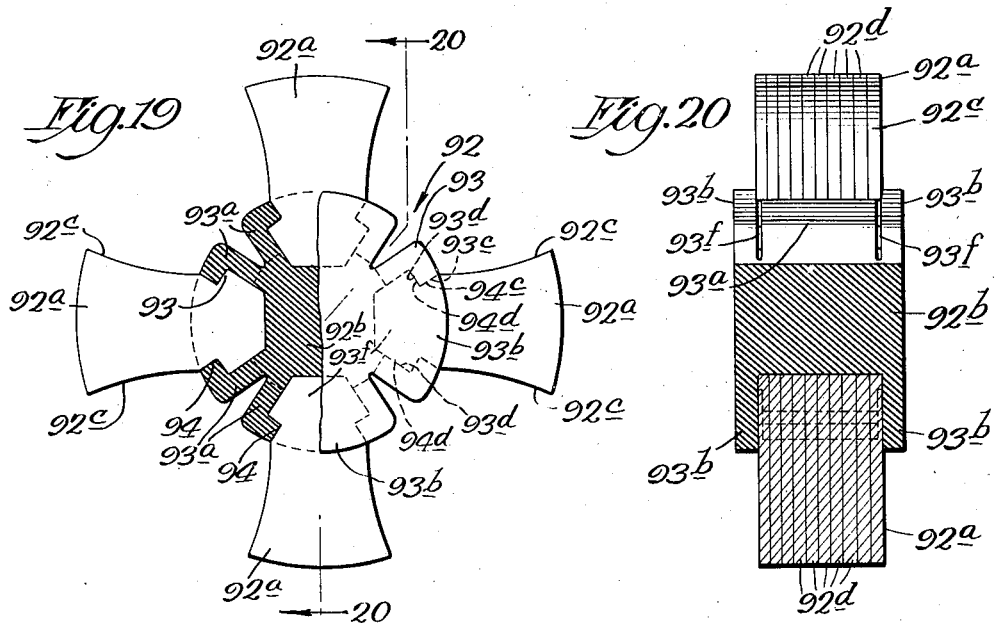
Inventor.
Louis Ricefield
By Davis, Macauley, May, Lindley & Smith
Attys.

Patented Dec. 31, 1935

2,025,828

UNITED STATES PATENT OFFICE 2,025,828

COUPLING

Louis Ricefield, Oak Park, Ill.

Application March 21, 1935, Serial No. 12,226

14 Claims. (Cl. 64—14)

This invention relates to improvements in couplings for connecting substantially aligned rotatable shafts in order to compensate for angular misalignment of the shafts, or relative lateral displacement thereof, or to permit relative endwise movement thereof. This invention is a modification or extension of the inventions described and claimed in my co-pending applications Serial No. 502,199, filed December 13, 1930, Serial No. 600,155, filed March 21, 1932, and Serial No. 739,419, filed August 11, 1934 and the present improvement relates particularly to that type of coupling in which a pair of metallic coupling members are fixed on substantially aligned shafts and have a plurality of lugs or jaws extending endwise therefrom and intermeshing loosely with each other, in combination with a power transmitting member interposed between the coupling members and having radiating resilient arms of compressible material each extending between and contacting with the faces of two of the lugs or jaws carried by opposite coupling members. There has heretofore been in commercial use a coupling of this type in which the opposite lug-engaging faces of each spider arm are parallel with each other and contact directly with similar parallel faces of the lugs or jaws carried by opposite coupling members. This form of coupling has been found to have the disadvantage that, upon relative angular movement of the coupling members, during the transmission of power from one shaft to the other, the spider arms are compressed to a greater degree at their outer ends than at their inner ends due to the greater relative movement of the opposed portions of the lugs or jaws engaging the spider arm as the distance from the axis of the shafts increases. This greater compression of the outer portions of the spider arms results in an increased wear upon these parts and also results in the setting up of a component of the power transmitted which acts radially inward and tends to move the spider arm toward the axis of the spider. This component of the transmitted force acting inwardly increases with the power transmitted and with the wear upon the spider arm and tends to cause a sliding of the component parts of the spider arm upon each other, particularly when the spider arm is formed of laminated layers of leather or other material, for example, thereby distorting and decreasing the life of the spider. As a result of these conditions, the uneven wear upon the arms of a spider, where each arm initially has opposite parallel lug-engaging faces, occurs unevenly as the coupling is continued in use until the outer end of the spider arm is entirely worn through, whereupon the spider must be discarded and replaced even though a substantial portion of each spider arm still remains.

The principal object of the present invention is to provide an improved flexible coupling of the type referred to in which the power transmitting arms or cushions of the spider are so formed and proportioned as to cause equal forces of compression to be set up in different parts of each spider arm when power is transmitted from one shaft to the other, with the result that the wear is substantially uniform over all parts of each spider arm or cushion, thereby eliminating radially acting forces tending to distort the spider arm or to effect relative movement of the parts thereof and increasing the life of the spider as compared with spiders of the form heretofore used. A further object of the invention is to provide a coupling of the type referred to in which the power transmitting members are so formed and proportioned that when the forces transmitted result in a radial component, this component will be reduced with increasing load or wear and will be a minimum when the load is the greatest. A further object of the invention is to provide a coupling of the type referred to comprising coupling members having longitudinally extending intermeshing jaws to contact with the radial arms of a power transmitting spider, wherein the contacting faces of the jaws and the spider arms are so inclined with respect to the radial axis of each spider arm that the inclination does not exceed the angle of friction of the materials used in the construction of the contacting surfaces of the coupling members and the spider, thus eliminating the tendency of the layers of the spider arms to move upon each other and also the tendency of the spider arm as a whole to move radially in either direction. A further object of the invention is to provide a coupling of the type referred to in which the contacting faces of each spider arm and the coacting lugs of the coupling members have surfaces which are inclined in opposite radial directions so that radially acting forces set up by the transmission of power from one shaft to the other tend to neutralize each other. Still another object of the invention is to provide a coupling comprising coupling members having intermeshing jaws contacting with the arms of a power transmitting spider wherein the opposite lug engaging faces of each spider arm are curved to coact with similar curved surfaces on the lugs or jaws so that substantially uniform stresses are set up in all parts of each spider arm, even where the spider arm is formed of material which varies in compressibility in an irregular manner as the distance from the axis of the coupling increases while at the same time, preferably, maintaining a tendency to neutralize the radial components of the forces which are set up by the transmission of power through the coupling. Another object is to provide a coupling comprising coupling members having lugs or jaws intermeshing loosely with each other and adapted to contact with intervening spider arms progressively from the inner portions of the spider arms outwardly as the power transmitted between the coupling members increases. A further object is to provide an improved construction of power transmitting spider adapted to permit the ready replacement of the spider arms independently of each other. Other objects relate to various features of construction and arrangement which will appear more fully hereinafter.

The nature of the invention will be understood from the following specification taken with the accompanying drawings, in which several embodiments are illustrated. In the drawings, Fig. 1 shows a side elevation of an improved coupling embodying the features of the present invention;

Fig. 2 shows a transverse section taken on the line 2—2 of Fig. 1;

Fig. 3 is a sectional view similar to that of Fig. 2, showing a modified form of construction in which the contacting faces of the lugs or jaws and the spider arms have parts which are inclined in opposite directions radially of the coupling member;

Fig. 4 is a sectional view similar to that of Fig. 2, showing a modified form of construction in which the contacting faces of the lugs or jaws and the spider arms, instead of being located in diverging planes as shown in Fig. 2, are formed as curved surfaces having a gradually increasing separation outwardly from their inner ends;

Fig. 5 is a sectional view similar to that of Fig. 2, showing a modified form of the construction illustrated in Fig. 4, in which the curved faces of the lugs or jaws and the spider arms are extended inwardly so that the inner portions of these surfaces on each spider arm diverge inwardly while the outer portions thereof diverge outwardly;

Fig. 6 shows a longitudinal axial section through another form of construction in which the opposite lug engaging faces of each spider arm diverge outwardly as plane surfaces but are adapted to have a progressively increasing contact with the adjacent faces of the lugs or jaws as the force transmitted through the coupling increases;

Fig. 7 is a sectional view on the line 7—7 of Fig. 6;

Fig. 8 is a sectional view similar to that of Fig. 7, showing a modified form of the construction illustrated in Fig. 4, whereby there is a progressively increasing contact of the opposite faces of each spider arm with the adjacent surfaces of the lugs or jaws as the force transmitted through the coupling increases;

Fig. 9 is a sectional view similar to that of Fig. 7, showing a modification of the structure illustrated in Fig. 3, wherein the opposite faces of each spider arm are adapted to have a progressively increasing contact with the adjacent surfaces of the lugs or jaws as the power transmitted increases;

Fig. 10 is a sectional view similar to that of Fig. 7, showing a modification of the structure illustrated in Fig. 5, whereby there is a progressively increasing contact of each spider arm with the jaw faces with increase of the power transmitted through the coupling;

Fig. 11 is a somewhat diagrammatic section taken transversely to the axis of a coupling of the type heretofore used in which the opposite faces of each spider arm and the contacting faces of the adjacent lugs or jaws are parallel to each other;

Fig. 12 is a diagrammatic sectional view similar to that of Fig. 11, showing on an enlarged scale the relative positions of the parts of a spider arm and two adjacent lugs or jaws of the form of construction illustrated in Fig. 2;

Fig. 13 is a sectional view similar to that of Fig. 11, showing on an enlarged scale a spider arm and two adjacent jaws of the form of coupling illustrated in Fig. 3, illustrating the effect of progressive wear upon opposite faces of the spider arm;

Fig. 14 is a sectional view similar to that of Fig. 11, illustrating one spider arm and two adjacent lugs or jaws of the form of coupling illustrated in Fig. 5, showing the effect of progressive wear upon opposite sides of the spider arm;

Fig. 15 is a longitudinal axial section similar to that of Fig. 6, showing a coupling which may be taken as any one of the couplings shown in Figs. 1 to 10, inclusive, illustrating the use of spider arms which have a progressively decreasing thickness longitudinally of the shafts as the distance from the axes of these shafts increases;

Fig. 16 is a sectional view similar to that of Fig. 15, showing a modification of any of the couplings illustrated according to which the thickness of each spider arm measured longitudinally of the shafts increases progressively from its inner end outwardly;

Fig. 17 shows a central vertical section through an improved coupling embodying an improved spider which may be employed with one of the types of couplings heretofore referred to;

Fig. 18 is a vertical section through the spider only, taken on the line 18—18 of Fig. 17;

Fig. 19 shows a partial side elevation and partial central vertical section through another form of spider which may be employed with the forms of couplings heretofore referred to; and Fig. 20 shows a sectional view taken on the line 20—20 of Fig. 19.

The form of the invention illustrated in Figs. 1 and 2 comprises a pair of similar coupling members 20 and 21 which are secured upon a pair of substantially aligned shafts 22 and 23, respectively, by means of keys 23$^a$ and set screws 23$^b$. The coupling member 20 comprises a disk extending transversely to the shaft and having a plurality of lugs or jaws 20$^a$ projecting longitudinally therefrom toward the other coupling member and intermeshing loosely with a plurality of similar lugs or jaws 21$^a$ which are formed on the disk of the other coupling member. Interposed between the two coupling members 20 and 21 and between the ends of the two shafts 22 and 23 there is a power transmitting member 25 in the form of a spider comprising a plurality of arms 25$^a$ radiating from a central hub 25$^b$ and each provided on opposite sides with flat faces 25$^c$. The opposite faces 25$^c$ of each spider arm are adapted to contact directly with the faces 20$^c$ and 21$^c$ of two of the lugs 20$^a$ and 21$^a$ which are carried by the opposite coupling members so that when power is transmitted from one coupling member to the other, the spider arms 25ᵃ are compressed by the relative angular movement of the coupling members 20 and 21.

The spider 25 may be formed of leather, preferably as a laminated structure, or of connected layers of duck or other textile fabric impregnated with rubber, or of other suitable compressible and resilient material adapted to yield under the forces transmitted through the coupling and to have a long life. The opposite flat faces 25ᶜ of each spider arm and the corresponding flat contacting faces of the adjacent lugs of the coupling members diverge outwardly at an angle which is preferably so arranged that when forces are transmitted through the spider arms or cushions from one coupling member to the other, all parts of each spider arm are compressed to substantially the same degree so that there is a substantially uniform wear upon all parts of each spider arm and the spider arm may, theoretically, be continued in use until all parts thereof have been worn off. The advantage of this form of construction may be appreciated by reference to the prior form of construction illustrated in Fig. 11, in which a pair of jaws 26ᵃ and 27ᵃ, carried by opposite coupling members, are shown as having opposite parallel faces 26ᶜ and 27ᶜ, respectively, adapted to receive between them the radiating arms 28ᵃ of a spider 28 which is similarly formed of leather, rubber, a combination of rubber and fabric or other suitable compressible material. In this construction, the relative angular movement of the two lugs or jaws 26ᵃ and 27ᵃ causes a greater compression of the outer portion of the spider arm 28ᵃ than of the inner part thereof and since the wear is proportional to the degree of compression of the material, the outer portion of the spider arm wears off more readily than the inner part so that it eventually assumes a tapered form. The limit of this wear is reached when the two lugs or jaws 26ᵃ and 27ᵃ occupy the positions shown by dotted lines 26ᵇ and 27ᵇ, at which time the outer edges of the faces 26ᶜ and 27ᶜ contact with each other, leaving an intermediate portion 28ᵇ of the spider arm which is still intact but which is triangular in cross-section and no longer under load because the load is then transmitted directly through the contacted outer edges of the jaws. The angle $a$ illustrates the extent of movement of the inner end of each lug or jaw which is necessary to bring about this extreme condition of wear and it will be noted that the same angle of movement of the outer edge of each lug or jaw produces a greater linear movement of the lug or jaw and a corresponding greater wearing off of the surface of the spider arm.

In contrast with the condition which arises after extreme use of the prior form of coupling, as shown in Fig. 11, the continued use of the form of the invention illustrated in Figs. 1 and 2 results in a substantially uniform wear upon all parts of the contacting surfaces of each spider arm, as illustrated particularly in Fig. 12. As there shown, the contacting faces 20ᶜ and 21ᶜ of the lugs or jaws may move gradually toward each other as the spider arm is worn off until they finally contact with each other along the line 29, leaving no part of the spider arm and maintaining, until the spider arm is entirely worn out, a divergence of the opposite faces of the spider arm which is adapted to cause any radially acting component of the power transmitted to act outwardly instead of inwardly. In order that the outwardly acting radial component of the force transmitted may not have the effect of tending to project the spider arm radially outward from its position between its contacting lugs or jaws, with the forms of construction illustrated in Figs. 1, 2 and 12, it is desirable that the angle of the opposite faces 25ᶜ of each spider arm, with respect to the central radial axis of the spider arm, shall not be greater than the angle of friction for the materials of which the spider arm and the lugs or jaws are composed, but each surface 25ᶜ may preferably be arranged in a plane which is substantially determined by the angle of friction. This type of construction in which the radiating jaws of the spider have diverging flat surfaces adapted to contact with the lugs or jaws of the coupling members is particularly adapted for use where the spider arms are formed of leather or other material in which a uniform degree of compression may be maintained by reducing the thickness of the spider arm in proportion to its distance from the center of the spider.

In Fig. 3 there is shown a modified form of construction which has the advantages of the form shown in Figs. 1 and 2 and, in addition, is provided with means for effecting a substantial neutralization of all radially acting components of the forces which are set up by the transmission of power from one coupling member to the other. In this form, the two coupling members 30 and 31 are provided with intermeshing jaws 30ᵃ and 31ᵃ adapted to contact with the radiating arms 32ᵃ which project outwardly from the hub 32ᵇ of the spider 32. This spider may be formed of any of the materials heretofore referred to in connection with the spider 25 and its construction differs from that illustrated in Fig. 2 in that the spider arms are of greater radial length and are provided with opposite lug engaging faces comprising a plurality of angularly disposed surfaces 32ᶜ and 32ᵈ adapted to coact with corresponding angularly disposed surfaces which are formed on the sides of the lugs or jaws 30ᵃ and 31ᵃ. Each lug or jaw 30ᵃ has two side faces each composed of an outer portion 30ᶜ and an inner portion 30ᵈ adapted to contact with two of the faces 32ᶜ and 32ᵈ, respectively, on one of the spider arms and each lug or jaw 31ᵃ is similarly provided with two side faces each composed of parts 31ᶜ and 31ᵈ which are adapted to coact with two of the surfaces 32ᶜ and 32ᵈ, respectively, formed on a spider arm. With this arrangement, each spider arm has an outer portion provided with opposite lug engaging faces which diverge outwardly and an inner portion provided with opposite lug engaging faces which diverge inwardly from an intermediate point where the spider arm is of minimum thickness.

The form of construction illustrated in Fig. 3 retains the major advantages of the form of construction illustrated in Figs. 1 and 2 and, in addition, the oppositely diverging faces on each spider arm may be so arranged that radially acting components of forces set up by the transmission of power through the coupling neutralize each other in each spider arm. As shown in Fig. 13, this form of construction may permit the continued wear of the opposite faces of the spider arm until the outer surfaces 30ᶜ and 31ᶜ of the lugs or jaws, which are shown as lying in planes containing the axis of the coupling, contact with each other along the line 33 which represents the condition when the outer portion of the spider arm has been completely worn away. When this position is reached, there remains an inner tapered portion 32ᵉ of the spider arm which lies between the opposite faces 30ᵈ and 31ᵈ of two adjacent lugs or jaws. This represents the extreme condition and shows that the spider arms may be more completely worn away before being discarded than is possible with the use of spider arms having opposite parallel sides, as illustrated in Fig. 11, but it will, of course, be understood that the spider is in practice discarded before this extreme condition of wear is reached. The form of construction illustrated in Fig. 3 is also peculiarly adapted for use where the spider is made up of leather or other material in which a uniform degree of compression may be maintained substantially by varying the thickness of the spider arm in proportion to the distance from the axis of the spider.

The resistance to compression of a compressible material varies not only with its specific nature but also with thickness. For example, rubber, and rubberized fabric, offer less resistance to an initial compression of a given amount than they do to a subsequent further compression of the same amount after they are partly compressed. It is also true that the compressibility of these materials increases with increase in thickness at a more rapid rate than in the case of leather, for example, and it is therefore necessary to increase the divergence of the faces of the spider arm and of the jaw faces more rapidly and in a manner adapted to compensate for these variables while maintaining a substantially uniform compression in all parts of the spider arm. This may preferably be done by increasing the divergence of the opposite faces of each spider arm and the contacting jaw faces along curved lines as the distance from the axis of the coupling increases. The coupling illustrated in Fig. 4 comprises two coupling members 40 and 41 having lugs or jaws 40ᵃ and 41ᵃ extending longitudinally therefrom and intermeshing loosely with each other so that they are adapted to receive between them the radiating arms 42ᵃ which project outwardly from the hub 42ᵇ of the spider 42. This spider 42 is adapted to occupy a position between the ends of the two shafts upon which the coupling members 40 and 41 are secured, as in the form of the invention shown in Fig. 1, and the spider, although capable of being formed of various resilient materials as heretofore explained, may preferably be formed of rubber or rubberized textile fabric, the layers of which are cemented together by the rubber as is well known in the art. The spider arms 42ᵃ have opposite curved surfaces 42ᶜ which diverge outwardly from the inner ends of the spider arms and which are adapted to coact with the correspondingly curved faces 40ᶜ and 41ᶜ of the lugs or jaws carried by the coupling members. In this construction, there is a gradual increase in the thickness of each spider arm from its inner end outwardly but this increase takes place more rapidly than the increase of the thickness of the spider arm in the construction shown in Fig. 2. The angle of contact between a spider arm 42ᵃ and the contacting surfaces of the lugs or jaws at any point should preferably be less than the angle of friction for the materials which are employed in forming the jaws and the spider arms so that the outwardly acting radial component of the force transmitted through the spider arm will not tend to project the spider arm outwardly.

In Fig. 5 there is illustrated an extension of the idea embodied in the construction shown in Fig. 4, involving the projection of the jaws and the spider arms inwardly to a greater extent so that portions of the spider arms have opposite curved surfaces diverging inwardly while other portions have opposite curved surfaces diverging outwardly, as in the case of the form of construction shown in Fig. 3. In this form, there are two coupling members 44 and 45, secured upon two substantially aligned shafts as in the forms of the invention previously described, and provided, respectively, with longitudinally extending lugs or jaws 44ᵃ and 45ᵃ which intermesh loosely with each other and which are adapted to receive between them the radiating arms 46ᵃ of the spider 46. In this case, the hub 46ᵇ of the spider is of lesser area than the hub shown in Fig. 4 and the spider arms 46ᵃ are of correspondingly greater length. These spider arms have opposite curved faces 46ᶜ which are adapted to contact with the correspondingly curved side faces 44ᶜ and 45ᶜ of the lugs or jaws. The surfaces 44ᶜ on each jaw are extended inwardly to the point where they intersect and the same arrangement is followed with the surfaces 45ᶜ of the jaws 45ᵃ. The contacting surfaces of the spider arms 46ᵃ are of similar extent and the arrangement is such that the opposite sides of the outer portion of each spider arm diverge outwardly while the opposite sides of the inner portion of each spider arm diverge inwardly. When forces are transmitted through the spider arms from one coupling member to the other, this opposite divergence of the curved surfaces at opposite ends of the spider arms is adapted to set up radial components of the forces transmitted which are adapted to neutralize each other so that there is no tendency of the spider arm to be projected radially in either direction or to have the component parts thereof separated due to the action of these radial forces. This form of construction is illustrated somewhat diagrammatically on an enlarged scale in Fig. 14, where it will be seen that if the spider arm 46ᵇ is worn off after continued use to the point where the two jaws 44ᵃ and 45ᵃ contact with each other, the lines 47 which extend from the axis of the coupling tangent to the jaw surfaces 44ᶜ and 45ᶜ will move through the angle *b* resulting in the contact of the two jaws at the point where the lines 47 are tangent to them, thus leaving only an intermediate tapered portion 46ᵈ of the spider arm and cutting off the remaining outer portion 46ᵉ thereof. This represents the extreme limit of the wear of the spider arm and shows that there is a greater consumption of the spider arm due to wear than is possible where the opposite sides of the arm are parallel to each other as shown in Fig. 11. It will also be apparent from an examination of Fig. 14 that the construction of the present invention provides an increased wearing surface on the spider arms and on the jaws, as compared with the construction in which the contacting faces of the spider arms and of the jaws are parallel. This will be apparent from a comparison of the spider arm 46ᵃ and the contacting surfaces of the jaws in Fig. 14 as compared with the spider arm and jaws represented by the dotted lines 48 which define the boundaries of the jaws which would be employed with a spider arm having parallel sides and having the same width at its outer end as the spider arm 46ᵃ. Where the arms of the spider have parallel sides, the arm is of lesser length radially of the coupling than the arm 46ᵃ and the area of the contact with the jaws is greatly reduced, as compared with the area of contact where curved or divergent surfaces are employed.

If, in any of the coupling constructions heretofore described, it be found impossible or impracticable to maintain uniform stresses throughout all parts of each spider arm without increasing the angle of divergence of the spider arm surfaces to a greater extent than is permitted by the angle of friction determined by the materials used, the difficulty may be overcome by providing for a progressive increase of the area of contact of the jaws with the spider arm as the force transmitted is increased. In Figs. 6 and 7 of the drawings, this improvement is shown applied to the form of coupling illustrated in Figs. 1 and 2. In this modification, two coupling members 50 and 51 are secured upon a pair of substantially aligned shafts 52 and 53, respectively, by means of keys 54 and set screws 55. The coupling member 50 has longitudinally extending lugs or jaws 50$^a$ which intermesh loosely with the similar lugs or jaws 51$^a$ carried by the other coupling member 51 and these lugs or jaws are adapted to receive between them the radiating arms 56$^a$ of a spider 56 having a hub 56$^b$ located between the ends of the shafts 52 and 53. The spider arms 56$^a$ are provided on their opposite sides with outwardly diverging surfaces 56$^c$ which are adapted to contact with the surfaces 50$^c$ and 51$^c$ formed on the lugs or jaws 50$^a$ and 51$^a$, respectively. When there is no load on the coupling, the surfaces 56$^c$ contact with only the inner portions of the surfaces 50$^c$ and 51$^c$ and from these inner areas of contact, these surfaces diverge outwardly as shown at 57 in Fig. 7. When a load is transmitted through the coupling, the spider arms are compressed between the lugs or jaws of the coupling members and the area of contact of the surfaces 56$^c$ with the surfaces 50$^c$ and 51$^c$ increases gradually with the increase in load until, finally, all of these surfaces may be in contact throughout the radial extent of the spider arms. As in the construction previously described, it is desirable to maintain the angle of divergence of the spider arms and of the opposed coupling jaws such that when the spider arms and jaws are in contact, the angle which is made with the radial axis of the spider arm will not exceed the angle of friction for the materials which are employed in the construction of the spider and the coupling.

In Fig. 8, the improvement last referred to has been applied to the form of construction shown in Fig. 4. In this modification, the two coupling members 60 and 61 are provided with longitudinally extending lugs or jaws 60$^a$ and 61$^a$, respectively, which intermesh loosely with each other and which receive between them the radiating arms 62$^a$ of the spider 62 which has a hub 62$^b$ located between the ends of the shaft to which the coupling members are secured. In this case, the opposite surfaces 62$^c$ of the spider arms are curved and diverge outwardly from their inner ends where they are united with the hub but they diverge gradually from the adjacent surfaces 60$^c$ and 61$^c$ of the coupling jaws with which they are adapted to contact so that when there is no load on the coupling, these surfaces of the spider arms and jaws contact only adjacent their inner extremities. As the load transmitted through the coupling increases, the area of contact of the spider arms with the jaws also increases until finally the entire areas of these surfaces may be in contact. In this form, also, it is desirable to maintain the angle of inclination of the contacting surfaces within the angle of friction determined by the materials employed and due to the fact that the area of contact of the spider arms and jaws increases with the increase of load transmitted through the coupling members, this may be done while maintaining a substantially uniform degree of compression in each part of the spider arm.

In Fig. 9, the feature of gradually increasing the area of contact of the spider arm and coupling jaws is illustrated in connection with the coupling shown in Fig. 3. In this modification, a pair of coupling members 66 and 67 are provided with longitudinally extending jaws 66$^a$ and 67$^a$, respectively, which intermesh loosely with each other and which receive between them the radiating arms 68$^a$ of the spider 68 which has a central hub 68$^b$ located between the ends of the shafts to which the coupling members are secured. In this case, each spider arm 68$^a$ is provided with lateral surfaces comprising outer portions 68$^c$ which diverge outwardly, and inner portions 68$^d$ which diverge inwardly from the intermediate part of the spider arm. The jaws 66$^a$ are provided toward their outer ends with lateral outwardly diverging surfaces 66$^c$ adapted to contact with the surfaces 66$^c$ of the spider arms and the jaws 67$^a$ are similarly provided with outwardly diverging surfaces 67$^c$ which are adapted to contact with the surfaces 68$^c$ of the spider arms. The jaws 68$^a$ and 67$^a$ are provided inwardly of the surfaces 66$^c$ and 67$^c$, respectively, with inwardly converging surfaces 66$^d$ and 67$^d$ which are adapted to contact with the surfaces 68$^d$ of the spider arms and which do not contact with these surfaces when the parts of the coupling are assembled. When there is no load on the coupling, the surfaces 68$^d$ of the spider arms are the only ones which engage the side faces of the lugs or jaws on the coupling members but as the load transmitted through the coupling increases, the divergence of the surfaces 68$^c$ from the surfaces 66$^c$ and 67$^c$ decreases so that there is a gradualy increasing area of contact until, finally, the entire areas of the surfaces 68$^c$ may contact with the faces of the jaws, thus compensating for variations in the compressibility of the material of the spider arms with variations in load in such a manner that all parts of the spider arms which are under compression are compressed in a substantially uniform degree.

In Fig. 10 there is shown a modification in which the idea of providing an initial divergence of portions of the side faces of the spider arms and of the adjacent faces of the lugs or jaws on the coupling members is embodied in a coupling of the type shown in Fig. 5. In this modification, the two coupling members 70 and 71 are provided with lugs or jaws 70$^a$ and 71$^a$, respectively, which intermesh loosely with each other and which receive between them the radiating arms 72$^a$ of the spider 72 which has a central hub 72$^b$ located between the ends of the shafts upon which the coupling members 70 and 71 are secured. In this construction, the curved side faces 72$^c$ of the spider arms are adapted to contact with the curved side faces 70$^c$ and 71$^c$ of the lugs or jaws carried by the coupling members. In this construction, the curvature of the surfaces 72$^c$ is slightly greater than that of the surfaces 70$^c$ and 71$^c$ so that these surfaces diverge from each other adjacent their outer extremities. This divergence, as in the construction of this type heretofore described, is adapted to be diminished as the load transmitted through the coupling increases.

In order to maintain a substantially uniform compression of all parts of the spider arms under any load, the width of the spider arms, measured longitudinally of the shafts, may also be varied in combination with any of the constructions heretofore described. Two examples of this variation of the width of the spider arms are shown in Figs. 15 and 16 and either of these figures may be regarded as a longitudinal section taken through any of the couplings heretofore described, illustrating the application thereto of the idea of tapering the sides of the arms of the power transmitting spider. In Fig. 15, the two coupling members 74 and 75 are secured upon a pair of substantially aligned shafts 74$^b$ and 75$^b$ by means of keys 77 and set screws 77$^a$. These coupling members have intermeshing lugs or jaws 74$^a$ and 75$^a$, respectively, which intermesh loosely with each other and which receive between them the radiating arms 76$^a$ of a power transmitting spider 76 which is constructed of resilient compressible materials as heretofore described and which has its radiating arms tapered so that their lateral surfaces 76$^b$ converge outwardly from the hub of the spider. In Fig. 16, the two coupling members 78 and 79 are secured upon a pair of substantially aligned shafts 80 and 81, respectively, and have mounted between them a power transmitting spider 82 formed of resilient compressible material and embodying a plurality of radiating arms 82$^a$ which intermesh loosely with the lugs or jaws 78$^a$ and 79$^a$ which are carried by the coupling members 78 and 79, respectively. The lateral sides 82$^c$ of the spider arms diverge outwardly from the hub 82$^b$ of the spider so that there is a gradually increasing volume of material to be compressed as the outer end of the spider arm is approached.

In Figs. 17 and 18 there is illustrated an improved form of spider which may be employed as a part of any of the couplings heretofore described, although the particular embodiment illustrated is adapted for use with a coupling of the specific form shown in Fig. 8. This modification comprises a pair of coupling members 86 and 87 which are adapted to be secured upon substantially aligned shafts and which have longitudinally extending lugs or jaws 86$^a$ and 87$^a$ adapted to intermesh loosely with each other and to receive between them the radiating arms 88$^a$ of a spider 88 which has a central hub 88$^b$ located between the ends of the shafts on which the coupling members are secured. The spider arms 88$^a$ have curved faces 88$^c$ diverging outwardly which are adapted to coact with the diverging faces 86$^c$ and 87$^c$ of adjacent lugs or jaws carried by the opposite coupling members. These spider arms diverge outwardly from the inner edges of the lugs or jaws and the arrangement of the contacting surfaces is similar to that illustrated in Fig. 4, except that the spider has only four radiating arms to engage the same number of jaws formed on the coupling members. Each spider arm 88$^a$ is made up of a plurality of layers 88$^d$ of leather, rubberized textile fabric or other compressible material suitable for the purpose which preferably has some resiliency and great wearing qualities. Where layers of leather, rubberized fabric or other materials are employed, these are cemented or otherwise secured together. The hub 88$^b$ may be formed of vulcanized rubber or of spring steel or other flexible resilient material, and the connection of this hub with the spider arms 88$^a$ is such that the spider arms may be readily detached and displaced without disassembling the parts of the coupling. The hub 88$^b$ is provided with a series of pockets 89 each adapted to receive the inner end of one of the spider arms 88$^a$. The lateral sides of these pockets are bounded by overhanging lips or flanges 89$^a$ provided on their outer sides with inwardly inclined surfaces 89$^b$ and on their inner sides with outwardly directed inclined surfaces 89$^c$. From the lower extremities of the surfaces 89$^c$, the walls of the pockets are inclined axially, as shown at 89$^d$, terminating in the inner wall of the pocket 89$^e$. The inner end portion of each spider arm is provided on opposite sides with notches 90 having surfaces 90$^b$ to contact with the surfaces 89$^b$ and having other surfaces 90$^c$ to contact with the surfaces 89$^c$ of the hub. Each spider arm is provided inwardly of the surfaces 90$^c$ with inwardly converging surfaces 90$^d$ which are adapted to contact with the surfaces 89$^d$ of the pocket and which have the same inclination as the surfaces 90$^b$. The flanges 89$^a$ forming the lateral walls of each pocket have sufficient resiliency to permit them to be spread apart when the inclined surfaces 90$^d$ at the inner end of a spider arm are pressed against the inclined surfaces 89$^b$ at the outer edge of the pocket and the head 90$^e$ which is formed at the inner end of the spider arm by the provision of the notches 90 is thus permitted to snap past the flanges 89$^a$ of the pocket until the spider arm reaches the position shown in Fig. 18, where it is interlocked securely with the hub. When it is desired to remove the spider arm, an outward pull thereon will cause the surfaces 90$^c$ on the spider arm to force the flanges 89$^a$ of the pocket outwardly due to their coaction with the surfaces 89$^c$, thereby permitting the spider arm to be removed and replaced readily by another after it has been worn without the necessity of removing any of the other spider arms or the hub from the assembled coupling.

In the form of construction shown in Figs. 17 and 18, the laminations of the spider arms are directed transversely to the directions in which forces are transmitted through the spider arms from one coupling member to the other but the same type of spider construction is capable of being employed where the laminations of the spider arms are directed edgewise to the jaws of the coupling members with which they contact, and one illustration of this adaptation of the invention is shown in Figs. 19 and 20, where a series of spider arms 92$^a$ is shown attached to a central hub 92$^b$ to form a complete spider 92. The arms 92$^a$ of the spider have outwardly diverging curved lateral faces 92$^c$ adapted to contact with the curved faces of intermeshing jaws on coupling members, such as those shown in Fig. 17, and these spider arms are preferably made up of parallel laminations 92$^d$ of leather, rubberized textile fabric or other compressible resilient material, with the laminations directed edgewise to the surfaces 92$^c$ which are adapted to contact with the coupling jaws. The hub 92$^b$ is preferably made up of rubber, steel or other material having sufficient resiliency to permit the spider arms to be snapped into place in the sockets of the hub and to be removed therefrom. The hub 92$^b$ comprises a central body having formed integrally therewith a series of radiating socket members 93 each having end flanges 93$^a$ which are adapted to interlock with the spider arms and lateral walls 93ᵇ which are adapted to engage the sides of the spider arms. The flanges 93ᵃ overhang the cavity of the socket 93 and are adapted to interlock with notches 94 which are formed in the edges of the inner portions of the spider arms. Each flange 93ᵃ has an inner inclined surface 93ᶜ adapted to contact with a surface 94ᶜ forming one of the walls of one of the notches in the coacting spider arm and the overhanging portions of the flanges are provided on their inner sides with outwardly directed inclined surfaces 93ᶜ which are adapted to contact with similar inclined surfaces 94ᶜ forming the inner wall of one of the notches 94. The inner end of each spider arm has inwardly converging surfaces 94ᵈ which are adapted to contact with the similarly inclined surfaces 93ᵈ formed in the pocket and each spider arm thus has an inner head 93ᵉ which is adapted to form an interlocking engagement with one of the sockets of the hub. In order to permit the necessary spreading of the flanges 93ᵃ at the ends of each socket, slots 93ᶠ are preferably provided at the ends of these flanges as shown in Fig. 20, this construction being particularly desirable when the hub is formed of metal.

In the construction of any of the couplings described above, it is desirable to arrange the contacting surfaces of the spider arms and jaws so that their inclination to the radial center line of the spider arm will be less than the angle of friction. As is well known, the angle of friction varies for different materials and it can be determined by reference to standard references or by actual test of the materials to be employed. For example, where leather is in contact with metal, in a dry condition, the angle of friction varies from 29.5 degrees to 31 degrees; when rubberized duck contacts with metal in a dry condition, the angle of friction has been found to be about 30 degrees; for rubberized asbestos when engaging metal, the angle of friction is about 31 degrees; and when vulcanized rubber engages metal in a dry condition, the angle of friction is about 25 degrees. In the examples of the couplings which have been illustrated and described, the opposite jaw engaging faces of the spider arm have been shown as being symmetrical with respect to an intermediate radial center line of the spider arm but the present invention contemplates the variation of this condition as may be desired, as by varying the general inclination of the spider arm so that its center arm is not radial, by using different degrees of inclination on the opposite faces of a spider arm, by employing a curved jaw engaging face on one side in combination with a flat jaw engaging face on the other, or by employing a divergent face on one side in combination with a face which is parallel to the radius of the coupling on the other side of the spider arm, as disclosed in my prior application Serial No. 502,199, above referred to. The improvements herein disclosed may also be employed in combination with spider arms and coupling jaws which are inclined longitudinally of the shafts as in said application last referred to. The planes of the opposite faces of each spider arm, when plane surfaces are employed, for example, may be made to intersect at the axis of the coupling or at a point on either side of that axis with respect to the position of the spider arm and this condition may be varied in connection with the variation of the angle of contact of the spider arm with the jaw faces and in connection with variation in the area of contact of the spider arm with the jaws. By suitably proportioning these variables in connection with a proper selection of the angle of divergence of the spider arm faces, with or without a radial variation in the width of the spider arms measured axially of the coupling, the parts may be so proportioned as to maintain a substantially uniform degree of compression in all parts of each spider arm, with a resulting increase in the life of the spider. All of these matters will be apparent to those skilled in the art. For purposes of illustration, however, reference is made to the considerations which may properly be taken into account in the design of a particular coupling for use with a load adapted to fluctuate through a wide range, such as the load transmitted through the driving shaft of a motor-driven forging hammer. Under these circumstances, the spider requires a high resiliency and it is therefore desirable to employ spider arms made up of rubberized duck with heavy layers of rubber between the layers of duck, forming a laminated resilient structure. Assuming that it is determined by calculation from a proposed load of 5600 inch pounds on the shaft that there will be a load of 750 pounds on each of three jaw surfaces of a coupling having an outside diameter of six inches, which is chosen for this load for commercial reasons, it is then determined by test or by reference to previously prepared data, that the material selected for the spider arm is capable of carrying a load of 750 pounds per square inch with satisfactory durability, thereby indicating that one square inch of contacting area is required between each jaw surface and the coacting spider arm. Assuming, arbitrarily, an axial jaw width of one inch, it follows that the jaw may have a radial length of one inch. The next step is to determine the positions of the inner and outer edges of each jaw face. Since an outside diameter of six inches has been determined upon, and the jaws are to be one inch long radially, the outer edge of each jaw will be three inches from the axis of the coupling while the inner edge of the jaw will be two inches from that axis. The relative angular movement of the jaws of each pair, under load, will therefore be in the ratio of these distances, or as 3 to 2. It is then in order to determine thicknesses of the spider arm material for the inner and outer edges which will give substantially the same degree of compression upon relative movement of the opposite jaw faces in the ratio just referred to. Tests show that the rubberized duck material, which has been selected for the spider arms, when having an uncompressed thickness of seven-eighths of an inch, will compress .16 of an inch under a pressure of 750 pounds per square inch while the same material having an uncompressed thickness of three-fourths of an inch will be compressed by the same load to the extent of .10 of an inch. Thus, if the inner end of the contacting portion of the spider arm be made three-fourths of an inch thick and the outer end be made seven-eighths of an inch thick, these thicknesses will have substantially the proper ratio of compression and it follows that the relative movement of the outer edges of the jaw will produce substantially the same compression on the outer end of the spider arm as will be produced by the lesser relative movement of the inner edges of the jaws. These dimensions will be sufficiently accurate for ordinary purposes although entire uniformity of compression of the inner and outer ends of the spider arm could be obtained by making the outer end somewhat less than seven-eighths of an inch in thickness. This result is contrasted with that which would be obtained if the jaw faces were parallel, in which case the outer end of each spider arm would have a fifty per cent greater compression than the inner end. The foregoing calculations establish the thicknesses of the extreme ends of the arm and since the material of the spider arm is such that its compressibility does not vary in linear fashion with increase in thickness, the contacting faces of the spider arms and jaws between the two extreme ends should properly be curved, and by calculating the proper angle of inclination and thicknesses for various radial distances from the axis in order to secure a uniform degree of compression while at the same time maintaining the angle of contact less than the angle of friction, a series of points may be located which will determine a curve representing the curvature of each of the contacting surfaces. Having determined this approximate curve, it is usually desirable in the design of the coupling to draw an arc around a single center which most closely approximates the curve which has just been determined. If the spider arm were to be constructed of leather, for example, or other material in which the compressibility varies with the thickness in direct proportion to the distance from the axis of the coupling, the formation of each spider arm surface may be determined by connecting the inner and outer edges, located as described above, by a plane surface. In determining the compressibility of different thicknesses of various materials which may be employed in spider arm construction, it is necessary to take into account not only the character of the materials but the question of whether they are under initial compression before a load is applied.

Where the term "cross-section" is used in the appended claims with reference to the spider arms, it will be understood as referring to the cross-section taken transversely of a spider arm between the contacting jaw faces, which cross-section, at any point, has such dimensions as functions of the distance of that point from the axis of rotation and the compressibility of the material of which the spider arm is formed, as will be apparent from the foregoing, that substantially uniform compressive stresses are produced in all parts of the spider arm when forces are transmitted from one coupling member to the other.

Although certain forms of the invention have been shown and described by way of illustration, it will be understood that the invention may be constructed in other embodiments coming within the scope of the appended claims.

The features of construction illustrated in Figs. 3, 4, 5, 6, 7, 8, 9, 10, 15 and 16, embodied in couplings in which uniform compressive stresses are not necessarily set up in all parts of each spider arm when forces are transmitted from one coupling member to the other, are claimed in my copending divisional application, Serial No. 49,169, filed November 11, 1935. The forms of construction shown in Figs. 17, 18, 19 and 20 are claimed in my copending divisional application, Serial No. 48,659, filed November 7, 1935.

I claim:

1. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two jaws carried by opposite coupling members, each of said arms having opposite jaw engaging faces diverging outwardly to contact with similar diverging surfaces formed on the coacting jaws, the cross-section of the material of each spider arm at any point outwardly from the axis of rotation being a function of the compressibility of said material and the distance of that point from said axis whereby substantially uniform compression stresses are produced in all parts of said arm when forces are transmitted from one coupling member to the other.

2. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms having parts of resilient compressible material provided with jaw-engaging faces which diverge outwardly along curved lines, the rate of divergence of said curved surfaces on said jaws being adapted to maintain a substantially uniform compression of all parts of each spider arm when forces are transmitted from one coupling member to the other.

3. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms having parts of resilient compressible material provided with jaw-engaging faces which diverge outwardly along curved lines, the rate of divergence of said curved surfaces on said jaws being adapted to maintain a substantially uniform compression of all parts of each spider arm when forces are transmitted from one coupling member to the other, the angle of inclination of each of said curved surfaces at any point of contact being within the angle of friction determined by the materials of the contacting parts of the spider arm and adjacent jaw at that point.

4. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms having opposite jaw engaging faces which diverge both inwardly and outwardly from an intermediate part of the spider arm to contact with similar inclined surfaces formed on the adjacent jaws, the cross section of the material of the outwardly diverging portion of each spider arm at any point outwardly from the axis of rotation of the coupling being a function of the compressibility of the material and the distance of that point from said axis, whereby substantially uniform compressive stresses are produced in all parts of said outwardly diverging portion when forces are transmitted from one coupling member to the other.

5. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said spider arms and the contacting jaws having coacting parts which diverge inwardly and outwardly along curved surfaces from an intermediate part of the spider arm, the cross section of the material of the outwardly diverging portion of each spider arm at any point outwardly from the axis of rotation of the coupling being a function of the compressibility of the material and the distance of that point from said axis, whereby substantially uniform compressive stresses are produced in all parts of said outwardly diverging portion when forces are transmitted from one coupling member to the other.

6. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and adapted to contact with two of said jaws carried by opposite coupling members, each of said spider arms having opposite outwardly diverging surfaces adapted to contact with oppositely disposed diverging surfaces formed on two adjacent jaws, said surfaces of each spider arm contacting initially on their inner portions only with said surfaces of said jaws but being adapted to increase their areas of contact as the force transmitted from one coupling member to the other increases, the cross section of the material of each spider arm at any point outwardly from the axis of rotation being a function of the compressibility of said material and the distance of said point from said axis whereby substantially uniform compressive stresses are produced in all parts of each spider arm which are under compression as forces are transmitted from one coupling member to the other.

7. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and adapted to contact with two of said jaws carried by opposite coupling members, each of said spider arms having opposite inwardly diverging surfaces adapted to contact continuously with adjacent faces of two of said jaws and having other outwardly diverging surfaces adapted to diverge from adjacent faces of two of said jaws when there is no load on the coupling, said outwardly diverging surfaces of said spider arms being adapted to increase their areas of contact with said jaws as the force transmitted from one coupling member to the other increases, the cross section of the material of the outwardly diverging portion of each spider arm at any point outwardly from the axis of rotation of the coupling being a function of the compressibility of said material and the distance of that point from said axis, whereby substantially uniform compressive stresses are produced in all parts of said outwardly diverging portion which are under compression as forces are transmitted from one coupling member to the other.

8. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and contacting with two of said jaws carried by opposite coupling members, each of said spider arms having a surface adapted to contact with an adjacent surface of one of said jaws but having an initial divergence from said surface of said jaw, said outwardly diverging surfaces of each jaw and an adjacent spider arm being adapted to increase their area of contact as the force transmitted from one coupling member to the other increases, the cross section of the material of each spider arm at any point outwardly from the axis of rotation being a function of the compressibility of said material and the distance of that point from said axis, whereby substantially uniform compressive stresses are produced in all parts of said arm which are under compression when forces are transmitted from one coupling member to the other.

9. The combination in a coupling for connecting substantially aligned shafts, of a pair of coupling members each adapted to be secured upon one of said shafts and having longitudinally extending jaws adapted to intermesh loosely with each other, and a power transmitting spider having radiating resilient arms each interposed between and contacting with two of said jaws carried by opposite coupling members, each of said spider arms having a curved surface diverging away from the opposite side thereof and adapted to contact with a similar curved surface formed on an adjacent jaw of one of said coupling members, said outwardly diverging surfaces of each jaw and an adjacent spider arm being adapted to increase their area of contact as the force transmitted from one coupling member to the other increases, the cross section of the material of each spider arm at any point outwardly from the axis of rotation being a function of the compressibility of said material and the distance of that point from said axis, whereby substantially uniform compressive stresses are produced in all parts of said arm which are under compression when forces are transmitted from one coupling member to the other.

10. A coupling for connecting substantially aligned shafts comprising the combination defined in claim 1 wherein the angle of divergence of each contacting surface of each spider arm with respect to the radial axis of that arm is within the angle of friction for the materials employed in the construction of that spider arm and the contacting jaws.

11. The combination in a coupling for connecting substantially aligned shafts, of a pair of coupling members each adapted to be secured upon one of said shafts and having longitudinally extending jaws adapted to intermesh loosely with each other, and a power transmitting spider interposed between said coupling members and having radiating arms each extending between and contacting with two of said jaws carried by opposite coupling members, each of said arms having an outer part of resilient material provided with diverging surfaces adapted to contact with diverging surfaces formed on the adjacent coacting jaws, the cross-section of the compressible portion of the material of each spider arm at any point outwardly from the axis of rotation being a function of the compressibility of the material of said compressible portion and the distance of said point from said axis whereby substantially uniform compression stresses are produced in all parts of the compressible portions of each spider arm when forces are transmitted from one coupling member to the other, the angle of inclination of said surfaces on each spider arm being within the angle of friction determined by the materials of the contacting parts of the spider arms and jaws.

12. A coupling for connecting substantially aligned shafts comprising the combination defined in claim 1 wherein the end faces of each spider arm between the contacting surfaces thereof are constructed to converge radially of the spider.

13. A coupling for connecting substantially aligned shafts comprising the combination defined in claim 1 wherein the end faces of each spider arm between the contacting surfaces thereof are constructed to converge radially inward of the spider.

14. A coupling for connecting substantially aligned shafts comprising the combination defined in claim 1 wherein the end faces of each spider arm between the contacting surfaces thereof converge radially outward of the spider.

LOUIS RICEFIELD.